Nov. 29, 1960     J. MESOJEDEC     2,962,067
EGG SHELLER
Filed April 16, 1958     2 Sheets-Sheet 1
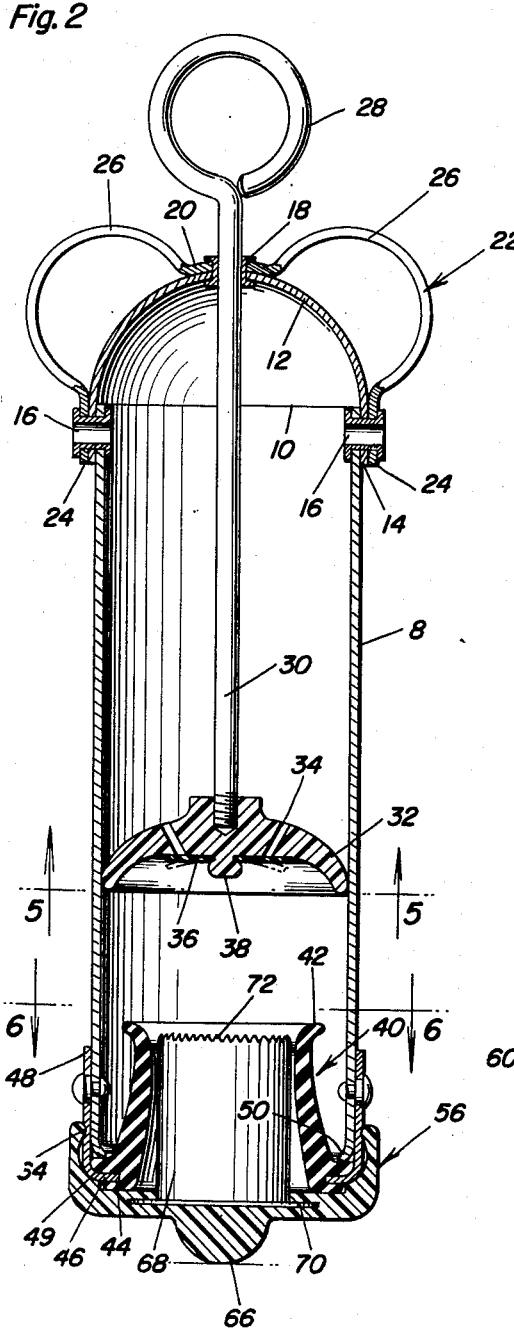
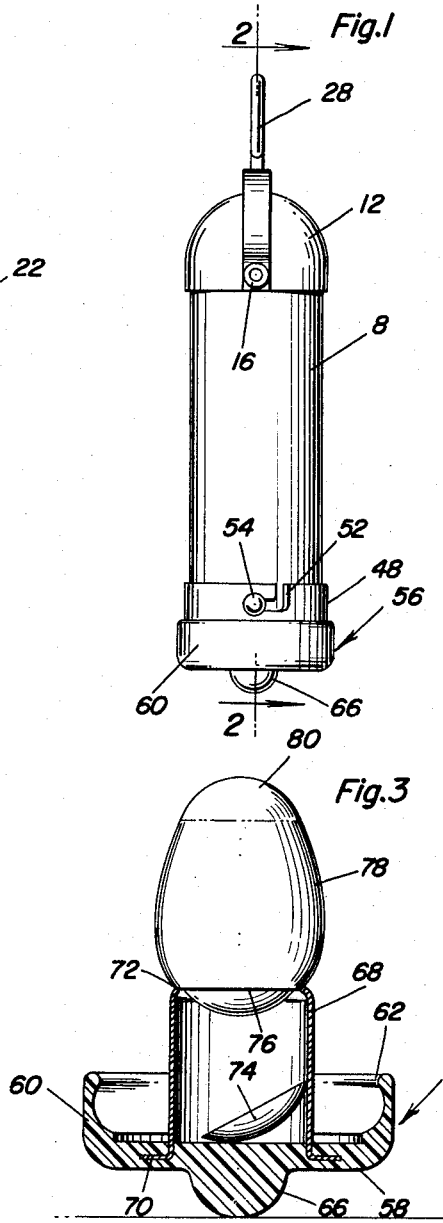
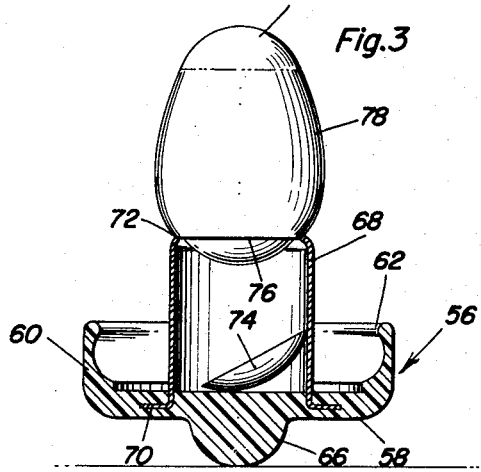
John Mesojedec
INVENTOR.

Nov. 29, 1960   J. MESOJEDEC   2,962,067
EGG SHELLER
Filed April 16, 1958   2 Sheets-Sheet 2
Fig.4
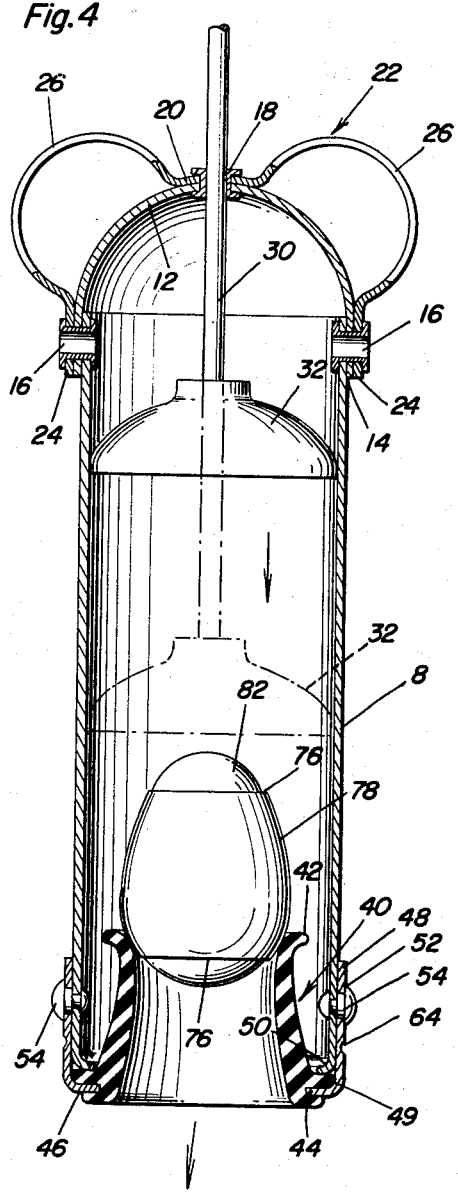
Fig.5
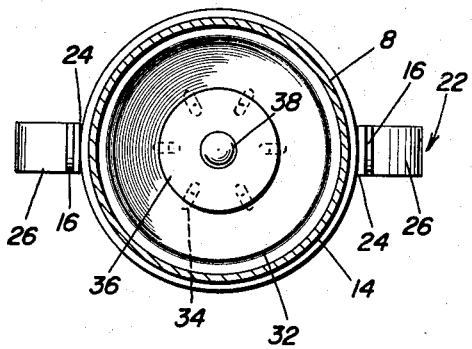
Fig.6
John Mesojedec
INVENTOR.
BY
Attorneys

United States Patent Office 2,962,067
Patented Nov. 29, 1960

2,962,067

EGG SHELLER

John Mesojedec, 1071 E. 71st St., Cleveland 3, Ohio

Filed Apr. 16, 1958, Ser. No. 728,886

3 Claims. (Cl. 146—2)

The present invention relates to a manually usable and operable holder and sheller for hard boiled eggs.

As the preceding general statement of the subject matter of the invention reveals hand-operated and portable implements and devices which aid in shelling eggs are not new. That is to say, it is old in the art to sever and remove either one or both ends of an egg shell, to support the then partly opened egg and to exert a force or pressure thereon in one manner or another to dislodge the egg from the shell. In certain prior art constructions a simple piston and cylinder air pump has been relied upon for imposing pressure on the egg proper and pushing it from the temporarily but stationarily held shell. In other instances a simple squeezable hand bulb has served as the pump.

As typical of a prior art adaptation generally analogous to the invention at bar reference may be made to the Kisner egg sheller 2,752,966. While the pump is different from that herein disclosed an analogy exists in first removing both ends of the egg shell and then supporting the partially shelled egg in a gasket-like receiver as a step preparatory to applying pump pressure and ejecting the egg. While Kisner is not exemplary of the state of the art it is used as a general guide to introduce the objective; namely, that it is one purpose of the instant addition to the art to provide a novel rubber or an equivalent holder and support for the partly shelled egg which provides the desired gasket feature and permits the egg to be perched thereon to facilitate the pump operating and ejecting step. The invention also features an attaching and retaining collar for the above-mentioned egg perching and basing mount or holder which is preferably held by a practical bayonet slot and pin joint and which supports a packing ring or flange having the desired close fitting cooperation with a lip provided therefor on the bottom of the cylinder.

Another object of the invention has to do with a rubber or an equivalent cup which is removably mounted on the stated collar and which serves not only as a closure for the lower end of the cylinder but as a carrier and operating member for an axially extending sleeve the upper end of which is provided with turned in cutting teeth by way of which the upper and lower ends of the egg shell may be severed to prepare the then partially shelled egg for the final perching and ejecting step.

Other objects, features and advantages will become more readily apparent from the following description and the accompanying drawings.

In the drawings wherein like numerals are employed to designate like parts throughout the views:

Fig. 1 is an elevational view on a relatively small scale showing an egg sheller constructed in accordance with the principles of the present invention.

Fig. 2 is a section, with parts in elevation, taken on the central vertical line 2—2 of Fig. 1, looking in the direction of the arrows.

Fig. 3 is a sectional view wherein the closing cap for the bottom of the cylinder has been detached and is being used to sever and remove the large and small ends of the egg shell.

Fig. 4 is a view similar to Fig. 2 and wherein the egg after having been partly shelled as seen in Fig. 3 is now perched on the egg basing mount for the purpose of operating the pump and ejecting the egg (shown in phantom lines).

Figs. 5 and 6 are cross-sections on the lines 5—5 and 6—6, respectively, of Fig. 2.

Briefly and broadly construed the complete ready-to-use device or implement comprises a simple, mechanical manually held and operated pump, that is, one of the aforementioned cylinder and piston types. Actually, however, the "pump" is more than that in that it also constitutes the means for holding the partially shelled egg and employs a cap-like device at the bottom which constitutes a closure or cover.

More explicitly the cylinder is denoted by the numeral 8 and it is open at the upper end 10 where it is provided with a dome-like top or cap 12 the lower end of which telescopes over the cylinder at 14, being secured thereto by hollow rivets or equivalent fasteners 16. The use of hollow rivets enables the "rivets" to serve also as practical air vents. In the crown of the cap there is a hollow rivet 18 which serves to secure the bight portion 20 of the metal strap which is fashioned into a dual handle 22. More specifically the end portions 24 of the strap are riveted in place and the bent portions 26 are fashioned into suitable finger grips. The finger grips are on opposite sides of the finger ring or finger-piece 28 on the upper end of the piston rod or plunger 30. The lower end of the rod is threaded to the central top portion of the concavo-convex piston 32. The piston has ports or orifices 34 for cooperation with a flap valve 36 operatively mounted on the knob-like extension 38. The valved ports 34 serve to allow intake of air to facilitate reciprocating the piston in the cylinder.

Referring now to what may be called the bottom of the pump or cylinder seen in Fig. 2 the numeral 40 designates the aforementioned partially shelled egg perching or basing amount. This is preferably a truncated conical rubber or equivalent sleeve the upper open mouth or end of which is provided with a suitably flared outstanding flange providing a seat 42 for the egg in the manner seen in Fig. 4. There is also an endless flange at the bottom of the sleeve which stands out and has a groove 44 into which a flange 46 on the attachable and detachable collar 48 is keyed and anchored. The flange 49 is approximately of outside diameter corresponding with the outside diameter of the pump cylinder 8 and it will be noticed in Fig. 2 that the lower end of the cylinder is deflected inwardly to provide an endless lip at 50. The flange 49 and lip 50 cooperate in providing a satisfactory air tight closure between the egg basing mount 40 and the pump cylinder. The collar 48 has a diametrically opposite bayonet slots 52 cooperating with attaching and retaining headed pins 54 whereby to enable one to readily attach and detach the collar.

Attention is now directed to the aforementioned and featured cylinder closing cup. This is denoted both as a cup and cap as seen in Fig. 3 and is designated by the numeral 56. It comprises a suitable bottom 58 and marginal rim 60, the upper end of which is provided with a lead 62 which snaps into a keeper groove 64 provided therefor in the ring-like collar 48. The substantially semi-circular boss 66 on the bottom 50 is there to permit the cap to rock from one side to the other and to be substantially self-levelling and to assist in handling the de-capping of the egg shell. The de-capping sleeve 68 has a flange 70 at the bottom embedded in the bottom 58 of the cap and the sleeve has its upper open end provided with a serrated lip providing turned in severing teeth 72. In Fig. 3 the severed cap 74 at the large end of the egg has been severed simply by catching hold of the egg and twisting it lightly relative to the sleeve 68 while holding the latter in one hand and operating the egg in the other hand. Thus one open end of the egg is denoted at 76 and the shell proper at 78 and the potentially removable upper end at 80. In Fig. 4 both ends of the shell have been de-capped, as it were, and the egg proper, which is to be ejected, is denoted by the numeral 82.

It will be evident that in order to prepare the egg for ejecting it is first necessary to detach the cap or cup 56 and to then bring the same and the egg into relationship and play as depicted in Fig. 3. As is evident the part 56 is held in the one hand the egg in the other and the egg is turned from one end to the other and the ends or caps 74 and 80 are easily severed and removed to expose the ends of the egg 82. The next step is of course to remove the collar 48 by way of the bayonet slot and pin means 52 and 54, to place the egg in the position desired and to replace the egg so that it assumes the perched ready-for-ejection position depicted in Fig. 4. Now by gripping the finger-grips 26 and holding the pump cylinder and then plunging the piston from the up position seen in full lines in Fig. 4 to the down position sufficient pressure is built up to literally "drive" the egg forcibly out of its shell as represented in phantom lines in Fig. 4.

With further reference to the preferred mode of using the invention, it is to be added that the egg may be brought down and against the teeth 72 of the de-capping sleeve until the teeth break through the egg shell. Then, by imparting a sideward rocking motion the de-capped portion will fall away.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An egg holder and sheller comprising a cylinder having a handle-equipped cap on an upper end thereof, a valved piston mounted for reciprocation on the cylinder, said cap having a central bearing, a rod attached to said piston and mounted for reciprocation in said bearing, said rod being provided at its upper end with a finger-grip, a circular collar embracing the lower end portion of the cylinder and detachably connected thereto, a truncated conical egg basing and perching mount fitting telescopically up into said cylinder and having a flange at its lower end connected to a flange at the lower end of said collar.

2. The structure defined in claim 1 and wherein the lower end of said cylinder has an endless turned in lip resting atop the flange on said mount.

3. A device for removing an egg from a decapped egg shell comprising a cylinder having an upper closed end and an open lower end, a tubular egg mount in the lower end of the cylinder fixed therein and having an upper external rim flange for supporting the decapped shell of an egg, a piston movable downwardly in the cylinder to exert air pressure against an egg in a decapped shell to dislodge the egg from the shell and discharge the egg downwardly out of said mount, a piston rod on said piston extending upwardly out of the upper end of the cylinder for manual operation to move the piston downwardly, said mount flaring downwardly to facilitate discharge of an egg out of said mount and said flange flaring upwardly and outwardly and being resilient to grip and seat a decapped egg shell thereon in response to downward pressure against the egg.

References Cited in the file of this patent

UNITED STATES PATENTS

| | | |
|---|---|---|
| 963,407 | Uhlir | July 5, 1910 |
| 2,752,966 | Kisner | July 3, 1956 |

FOREIGN PATENTS

| | | |
|---|---|---|
| 975,348 | France | Oct. 11, 1950 |